(12) United States Patent
Lee et al.

(10) Patent No.: US 12,534,338 B2
(45) Date of Patent: Jan. 27, 2026

(54) MAGNETIC FIELD SENSING-BASED NONCONTACT BUTTON APPARATUS, ELEVATOR CONTROL PANEL, AND OPERATING METHOD THEREOF

(71) Applicant: Korea Electronics Technology Institute, Seongnam-si (KR)

(72) Inventors: Sang Yub Lee, Seongnam-si (KR); Jae Kyu Lee, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 1350 days.

(21) Appl. No.: 17/136,643

(22) Filed: Dec. 29, 2020

(65) Prior Publication Data

US 2022/0098005 A1    Mar. 31, 2022

(30) Foreign Application Priority Data

Sep. 29, 2020   (KR) ........................ 10-2020-0127458

(51) Int. Cl.
  *B66B 1/52*    (2006.01)
  *G01V 3/08*    (2006.01)
  *H03K 17/95*   (2006.01)

(52) U.S. Cl.
  CPC .................. *B66B 1/52* (2013.01); *G01V 3/08* (2013.01); *H03K 17/95* (2013.01); *B66B 2201/4623* (2013.01); *B66B 2201/4638* (2013.01)

(58) Field of Classification Search
  CPC .............. B66B 1/52; B66B 2201/4623; B66B 2201/4638; B66B 1/461; B66B 1/468;
  (Continued)

(56) References Cited

U.S. PATENT DOCUMENTS

| 11,221,680 B1* | 1/2022 | Clements ................ G06F 3/017 |
| 2006/0011419 A1* | 1/2006 | Chuang ................... B66B 1/461 |
| | | 187/316 |

(Continued)

FOREIGN PATENT DOCUMENTS

| JP | 2011-130857 A | 7/2011 |
| JP | 2015-151253 A | 8/2015 |

(Continued)

OTHER PUBLICATIONS

Zijian, An Autonomous Elevator Button Recognition System Based on Convolutional Neural Networks, 2017, IEEE, 2533-2539 (Year: 2017).*

*Primary Examiner* — Bickey Dhakal
(74) *Attorney, Agent, or Firm* — Knobbe, Martens, Olson & Bear, LLP

(57) ABSTRACT

This application relates to a magnetic field sensing-based noncontact button apparatus, an elevator control panel, and an operating method thereof. In one aspect, the operating method includes collecting a magnetic field sensor value corresponding to each of a plurality of buttons based on an action of a user for button manipulation. The method also includes assigning a weight value, used for activating a button, to a Z-axis value of the magnetic field sensor value corresponding to a button input direction of the user for each button and collecting number of uses of each button. The method further includes adjusting a variation width of a weight function based on the Z-axis value based on the number of uses of each button to construct a surface data set corresponding to each button, and setting the surface data set to learning data to learn an algorithm for activating the button.

20 Claims, 13 Drawing Sheets

(58) Field of Classification Search
CPC ...... G01V 3/08; H03K 17/95; H03K 17/9502; H03K 17/955; H03K 17/941; H03K 2217/94026
See application file for complete search history.

(56) References Cited

U.S. PATENT DOCUMENTS

| | | | |
|---|---|---|---|
| 2018/0354746 A1 | 12/2018 | Blanchard | |
| 2022/0048733 A1* | 2/2022 | Sahinoglu | ................ G06N 3/04 |
| 2022/0106159 A1* | 4/2022 | Yerazunis | ............ H03K 17/941 |
| 2023/0348227 A1* | 11/2023 | Speranza | ................ B66B 1/468 |
| 2024/0059524 A1* | 2/2024 | Kolobov | ................ B66B 1/461 |

FOREIGN PATENT DOCUMENTS

| | | |
|---|---|---|
| KR | 10-0556598 A | 3/2006 |
| KR | 20-0477281 B | 5/2015 |

* cited by examiner

SET WEIGHT VALUE BASED
ON Z VALUE (HEIGHT, DEPTH)

MAGNETIC FIELD SENSING-BASED NONCONTACT BUTTON APPARATUS, ELEVATOR CONTROL PANEL, AND OPERATING METHOD THEREOF

CROSS-REFERENCE TO RELATED APPLICATIONS

This application claims priority under 35 U.S.C § 119 to Korean Patent Application No. 10-2020-0127458, filed on Sep. 29, 2020, the disclosure of which is incorporated herein by reference in its entirety.

BACKGROUND

Technical Field

The described technology relates to a magnetic field sensing-based noncontact, button apparatus including a plurality of buttons, an elevator control panel, and an operating method thereof.

Description of Related Technology

Generally, elevators or escalators are installed in various buildings for living or work, for moving persons or things in a vertical direction, and particularly, elevators are representative transportation means having an advantage where an elevator quickly moves persons or things, boarding the elevator, to a corresponding floor in a high-rise building.

SUMMARY

One aspect provides a magnetic field sensing-based noncontact button apparatus including a plurality of buttons, an elevator control panel, and an operating method thereof, which collect a magnetic field sensor value based on an action of a user to activate a button, assign a weight value, used for activating the button, to a Z-axis value corresponding to a button input direction of the user, adjust a width of a weight function on the basis of the number of uses of each of a plurality of buttons, and apply the adjusted width of the weight function, thereby driving the button on the basis of the magnetic field sensor value which is relatively more accurate.

In one general aspect, an operating method of a magnetic field sensing-based noncontact button apparatus, including a plurality of buttons, includes: collecting a magnetic field sensor value corresponding to each of a plurality of buttons on the basis of an action of a user for button manipulation; assigning a weight value, used for activating a button, to a Z-axis value of the magnetic field sensor value corresponding to a button input direction of the user for each of the plurality of buttons; collecting number of uses of each of the plurality of buttons; adjusting a variation width of a weight function based on the Z-axis value on the basis of the number of uses of each of the plurality of buttons to construct a surface data set corresponding to each of the plurality of buttons: and setting the surface data set to learning data to learn an algorithm for activating the button.

In another general aspect, a magnetic field sensing-based noncontact button elevator control panel including a target floor input button, an entrance door control button, an emergency call button, a display unit, and a control unit controlling each of the buttons and the display unit, wherein the control unit collects a magnetic field sensor value corresponding to each of a plurality of buttons on the basis of an action of a user for button manipulation, assigns a weight value, used for activating the button, to a Z-axis value corresponding to a button input direction of the user for each button, collect the number of uses of each button, adjusts a variation width of a weight function based on the Z-axis value on the basis of the number of uses of each button to construct a surface data set corresponding to each button, and sets the surface data set to learning data, thereby learning an algorithm.

In another general aspect, a magnetic field sensing-based noncontact button apparatus including a control unit controlling a plurality of input buttons, wherein the control unit collects a magnetic field sensor value corresponding to each of a plurality of buttons on the basis of an action of a user tor button manipulation, assigns a weight value, used for activating the button, to a Z-axis value corresponding to a button input direction of the user for each button, collect the number of uses of each button, adjusts a variation width of a weight function based on the Z-axis value on the basis of the number of uses of each button to construct a surface data set corresponding to each button, and sets the surface data set to learning data, thereby learning an algorithm.

Other features and aspects will be apparent from the following detailed description, the drawings, and the claims.

DETAILED DESCRIPTION

Figure 1:
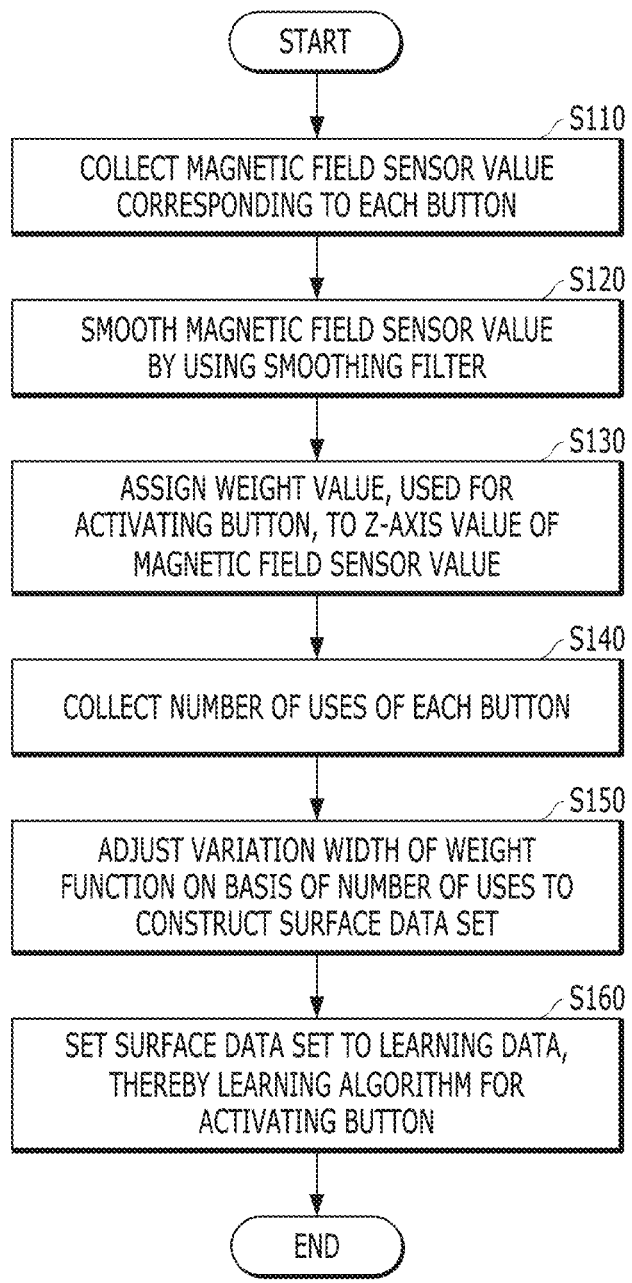
FIG. 1 is a flowchart of a noncontact button apparatus learning method according to an embodiment of the described technology.

An elevator boarding platform is provided in each floor of a corresponding building, a boarding path is formed in a vertical direction in buildings, and an elevator car moves passengers, boarding the elevator car through each elevator boarding platform, to a target floor based on a button input while moving in an upward and downward direction along the boarding path.

However, because the elevator button is manipulated by various persons, there is a risk factor in terms of hygiene. Particularly, in an infective environment such as Corona 19, there is a case where a person is infected through a manipulation button of an elevator, and thus, it is required to develop technology for selecting a corresponding floor through noncontact without direct manipulation in an elevator, for decreasing the occurrence of infection.

The advantages, features and aspects of the described technology will become apparent from the following description of the embodiments with reference to the accompanying drawings, which is set forth hereinafter. The described technology may however, be embodied in different forms and should not be construed as limited to the embodiments set forth herein. Rather, these embodiments are provided so that this disclosure will be thorough and complete, and will fully convey the scope of the described technology to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that although the terms including an ordinary number such as first or second are used herein to describe various elements, these elements should not be limited by these terms. These terms are only used to distinguish one element from another element. For example, a first element may be referred to as a second element without departing from the spirit and scope of the described technology, and similarly, the second element may also be referred to as the first element.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The described technology relates to a magnetic field sensing-based noncontact button apparatus 200 including a plurality of buttons, an elevator control panel 100, and an operating method thereof.

In an embodiment of the described technology, for example, the button apparatus 200 may be an elevator control panel 100, but is not limited thereto and may be applied to various apparatuses which include a plurality of buttons and are manipulated.

In a magnetic field sensing-based elevator button, a button input of a user may be performed based on noncontact, and thus, there may be an advantage in terms of hygiene. However, in a magnetic field sensing-based method, in a case where various buttons are disposed to be closely adjacent to one another, there may be a possibility that buttons are recognized to overlap, and due to this, an accuracy of sensing may be low, causing a problem of a malfunction where an undesired button is pressed regardless of an intention of a user.

To this end, in the related art, a high-specification video processing method or video based deep learning technology is applied, but the price of a module increase and an accuracy of sensing is low in an environment which is difficult to recognize indoor lighting or a camera.

In order to solve such a problem, in an embodiment of the described technology, a magnetic field sensor value may be collected for increasing an accuracy of selecting each button, and based thereon, machine learning and inference learning may be performed, thereby enabling elevator button recognition with enhanced accuracy thereof.

Hereinafter a magnetic field sensing-based noncontact button apparatus operating method including a plurality of buttons (hereinafter referred to as a noncontact button apparatus operating method) according to an embodiment of the described technology will be described in detail with reference to FIGS. 1 to 9.

Figure 9:
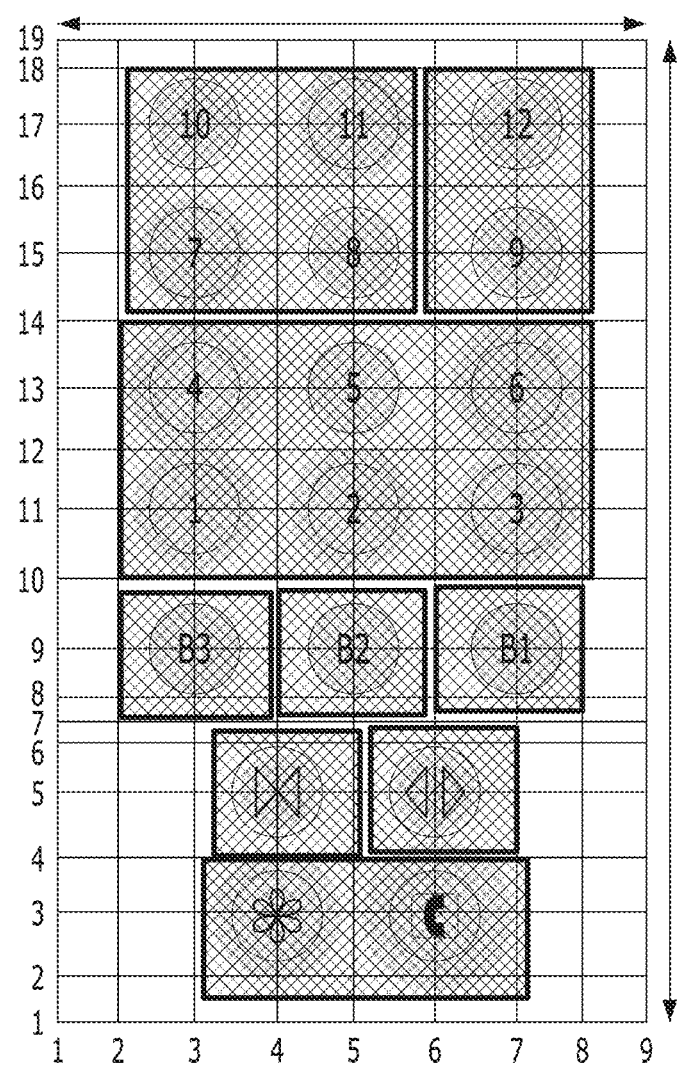

It may be understood that each of steps of FIGS. 1 and 9 is performed by a control unit (or a controller) 140 included in the noncontact elevator control panel 100 and a control unit 230 included in the button apparatus 20, but the present embodiment is not limited thereto.

FIG. 1 is a flowchart of a noncontact button apparatus learning method according to an embodiment of the described technology.

A noncontact button apparatus operating method according to an embodiment of the described technology may include a process of performing pre-learning for operating of the elevator control panel 100 or the button apparatus 200 and a process of recognizing the elevator control panel 100 and a button of the button apparatus 200 on the basis of a learned algorithm.

First, referring to FIG. 1, the control unit 140 may collect a magnetic field sensor value corresponding to each of a plurality of buttons on the basis of an action of a user for manipulating a button in step S110.

For example, each of the plurality of buttons may include at least one magnetic field sensor.

The magnetic field sensor may sense a variation of a magnetic field caused by the approach of a hand of a user to recognize a position or an action of the hand of the user. Based on such principle, the described technology may active a corresponding button through noncontact when an action of the user approaches a button. For example, the magnetic field sensor may include a capacitor and may sense a variation of a magnetic field based on a variation of a capacitance.

However, a variation of a magnetic Held may be a variation of an analog signal, and it may be difficult to sense a variation of a magnetic field in real time. When an action is small, a problem where it is unable to sense a variation of a magnetic field may occur.

To tins end, as described below, the control unit 140 may assign a weight value to a Z-axis value, adjust a width of a weight function, and adjust a kernel window size, thereby enabling a button to be more accurately recognized based on a magnetic field sensor value.

Subsequently, in step S120, the control unit 140 may smooth the collected magnetic field sensor value by using a smoothing filter.

Figure 2:
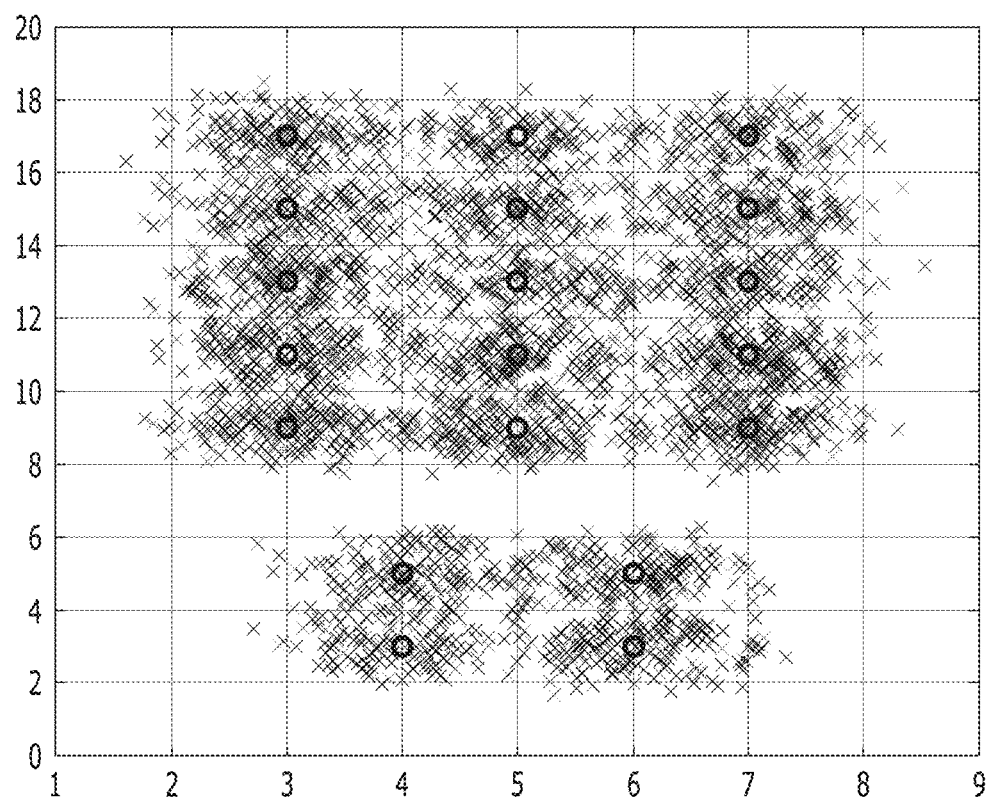
FIG. 2 is a diagram illustrating an X-axis magnetic field sensor value and a Y-axis magnetic field sensor value of a button apparatus recognized for each button.
Figure 3:
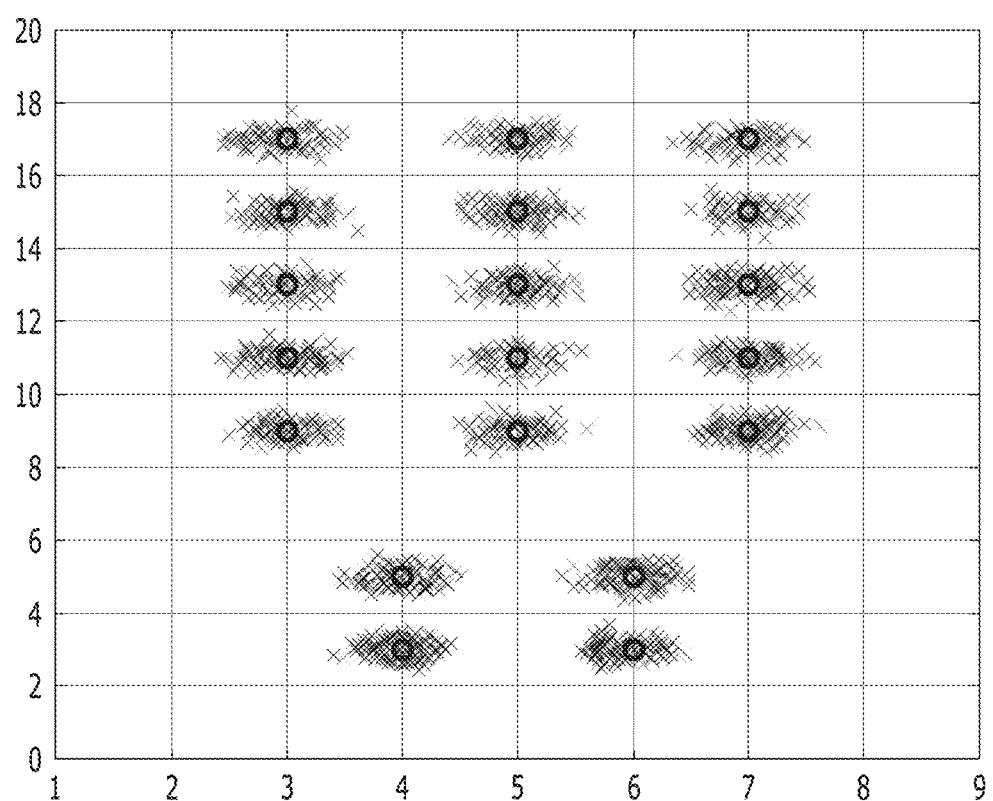
FIG. 3 is a diagram illustrating an X-axis magnetic field sensor value and a Y-axis magnetic field sensor value of a button apparatus on which a smoothing process is completed.

FIG. 2 is a diagram illustrating an X-axis magnetic field sensor value and a Y-axis magnetic field sensor value of the elevator control panel 100 and the button apparatus 200 recognized for each button. FIG. 3 is a diagram illustrating an X-axis magnetic field sensor value and a Y-axis magnetic field sensor value of the elevator control panel 100 and the button apparatus 200 on which a smoothing process is completed.

A magnetic field sensor value sensed based on an action of a user may include noise, and in an embodiment of the described technology, the smoothing filter may remove the noise to reduce a variation of a corresponding value.

Subsequently, in step S130, the control unit 140 may assign a weight value, used for activating a button, to a Z-axis value of the magnetic field sensor value corresponding to a button input direction of the user for each button.

Figure 4:
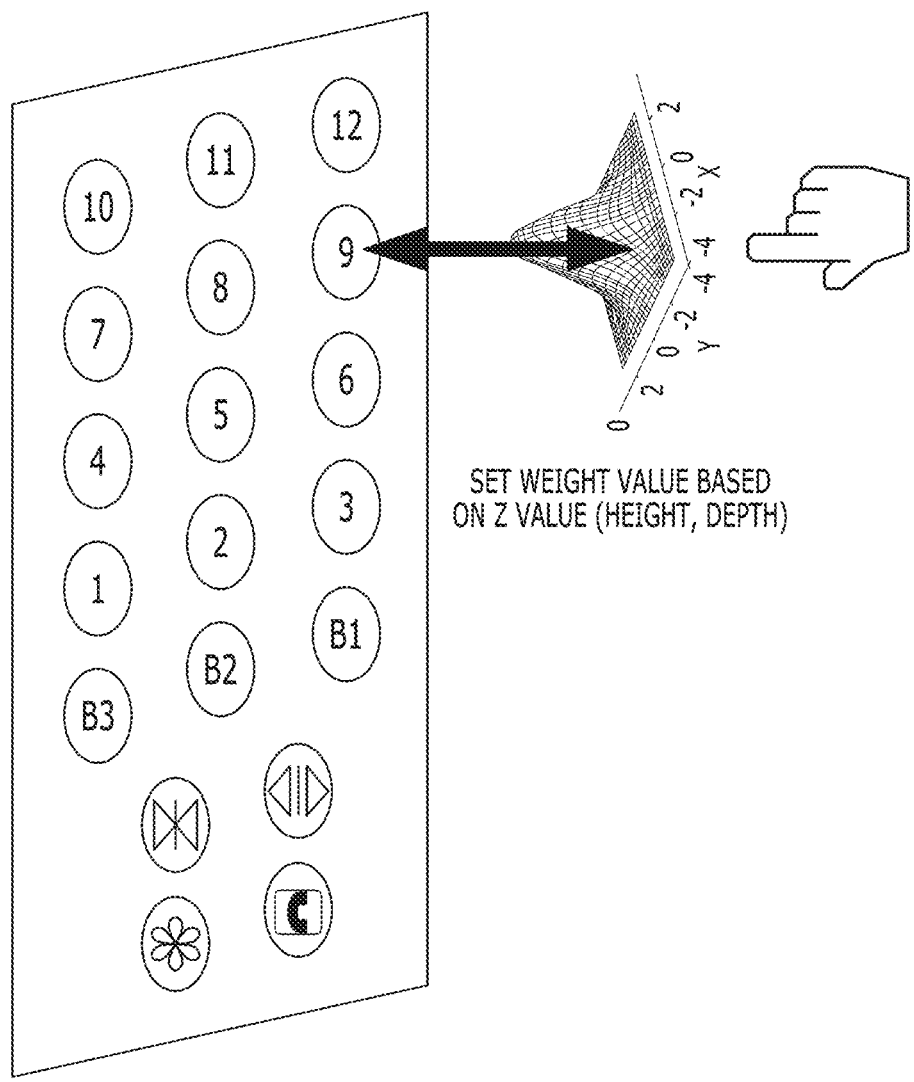
FIG. 4 is a diagram for describing a weight value with respect to a Z-axis value.

FIG. 4 is a diagram for describing a weight value with respect to a Z-axis value.

In an embodiment, the control unit 140 may smooth a magnetic field sensor value by using a smoothing filter, and then, as an action of a user approaches smoothed data in a button input direction, the control unit 140 may assign a larger weight value to a Z-axis value to assign a condition needed for activating a button.

In this case, the weight value may be assigned to be proportional to a distance, and by applying a predetermined distance-based weight value, a weight value may be assigned to be larger as a distance decreases.

When the weight value is applied, an accuracy of a corresponding button region may increase based on an X-axis value and a Y-axis value.

Subsequently, the control unit 140 may collect the number of uses of each of a plurality of buttons by the user in step S140 and may adjust a variation width of a weight function based on the Z-axis value on the basis of the number of uses of each of the plurality of buttons to construct a surface data set corresponding to each of the plurality of buttons in step S150.

FIGS. 5 and 6A to 6C are diagrams for describing a process of adjusting a variation width of a weight function to construct a surface data set corresponding to each of a plurality of buttons.

Figure 5:
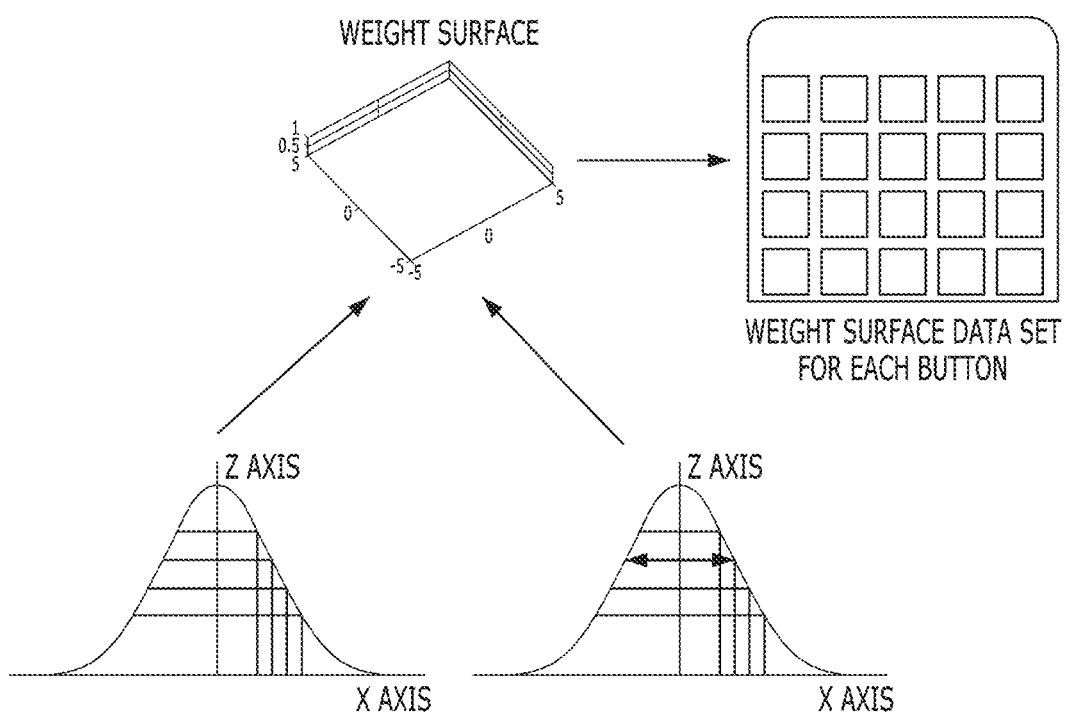
FIG. 5, FIG. 6A, FIG. 6B and FIG. 6C are diagrams for describing a process of adjusting a variation width of a weight function to construct a surface data set corresponding to each of a plurality of buttons.

In an embodiment, as illustrated in FIG. 5, the control unit 140 may check the number of uses of each of a plurality of buttons by a user to adjust a variation width W of a weight function based on a Z-axis value. For example, the control unit 140 may decrease a variation width of a weight function corresponding to a button, where the number of uses thereof by the user is greater than or equal to a threshold value, of the plurality of buttons, thereby enabling the user to accurately recognized a corresponding button. On the other hand, the control unit 140 may increase a variation width of a weight function corresponding to a button, where the number of uses thereof by the user is less than the threshold value, of the plurality of buttons.

That is, when a variation width of a weight function is reduced, a user should more accurately press a corresponding button. This may be for minimizing an abnormal operation performed on a frequently-used button.

Figure 6A:
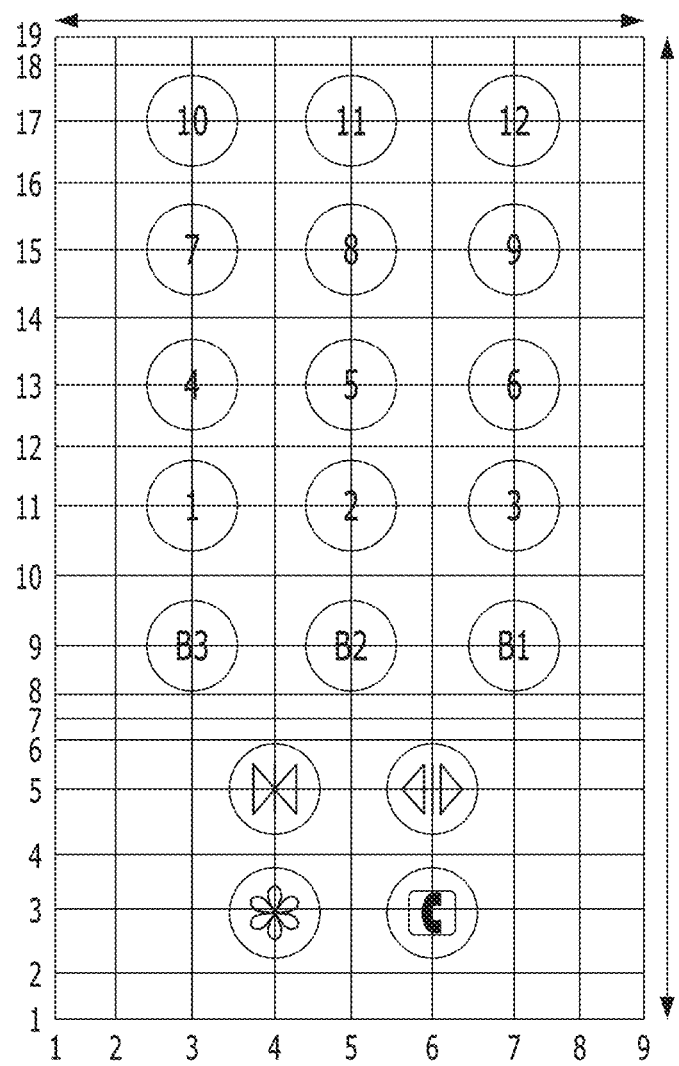
Figure 6B:
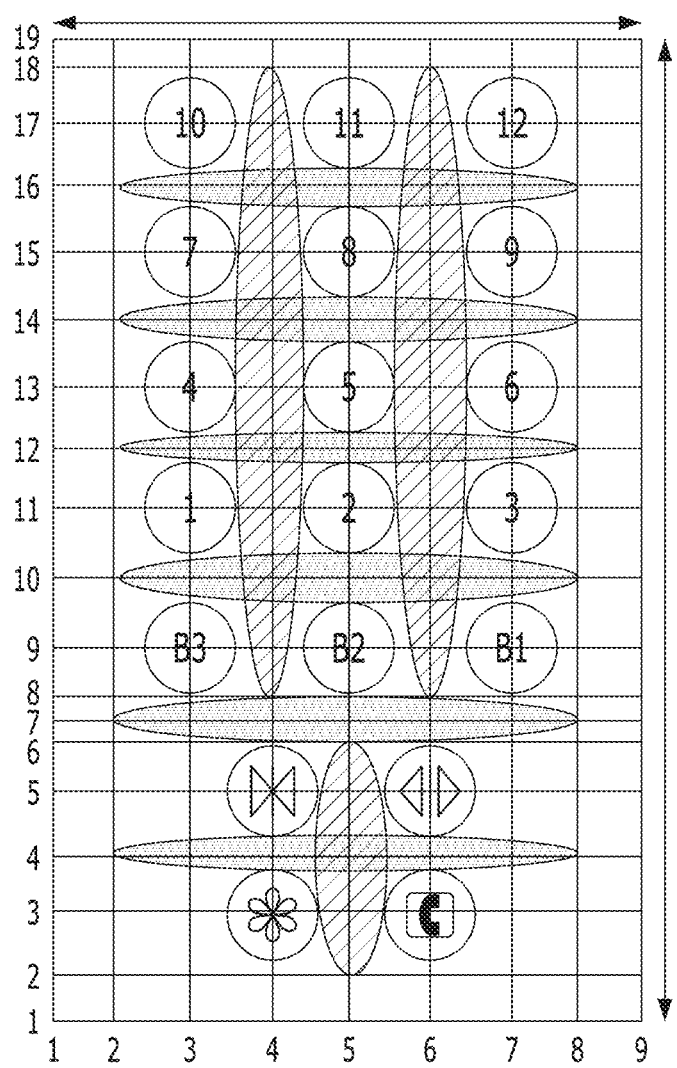
Figure 6C:
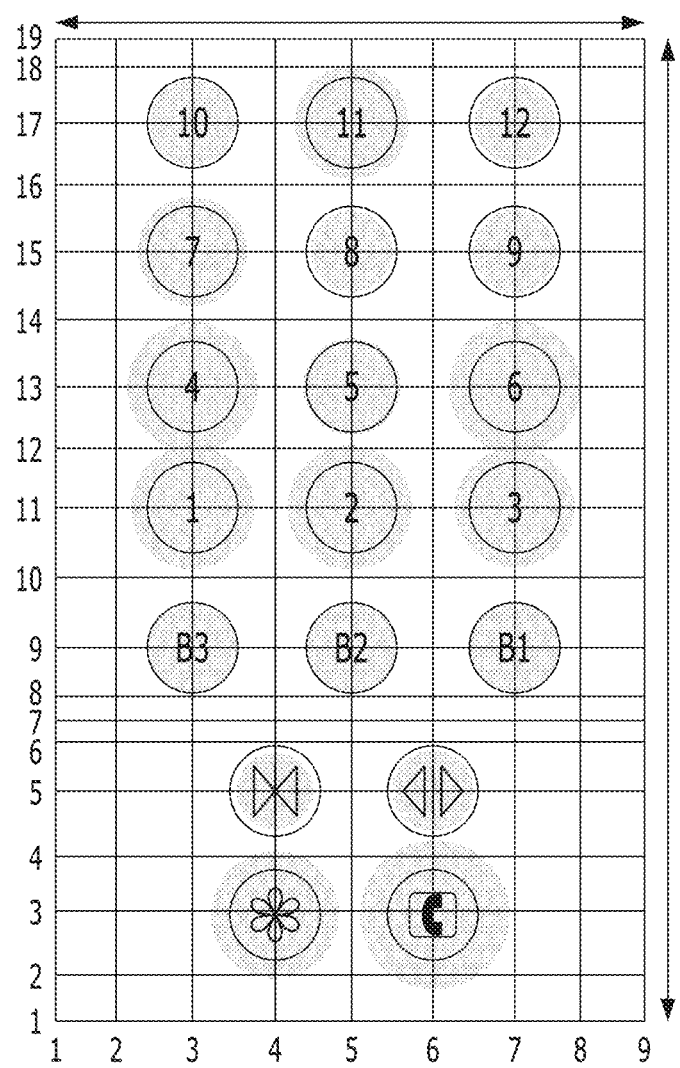

Referring to FIGS. 6A to 6C, as the variation width W of the weight function based on the Z-axis value is adjusted, the control unit 140 may generate a surface dataset corresponding to each of the plurality of buttons.

To this end, first, the control unit 140 may generate pieces of first line information respectively passing through X axes and Y axes of the plurality of buttons as in FIG. 6A, and as in FIG. 6B, the control unit 140 may generate pieces of second line information which are parallel to one another along a plurality of first lines and do not pass through the plurality of buttons.

Subsequently, as in FIG. 6C, the control unit 140 may generate a region corresponding to the plurality of buttons (hereinafter referred to as a button region) and a non-button region corresponding to the first and second line information and may apply a variation width-adjusted weight function to a plurality of button regions and the non-button region to construct a surface data set corresponding to each of the plurality of buttons.

As a result, the plurality of button regions may be differently set for each button, and in a button which is more frequently used, a button region may be set to be relatively less, thereby more minimizing an abnormal operation.

Subsequently, in step S160, the control unit 140 may set the surface data set to learning data to learn an algorithm for activating a button. In this case, an embodiment of the described technology may use a KNN algorithm.

Figure 7A:
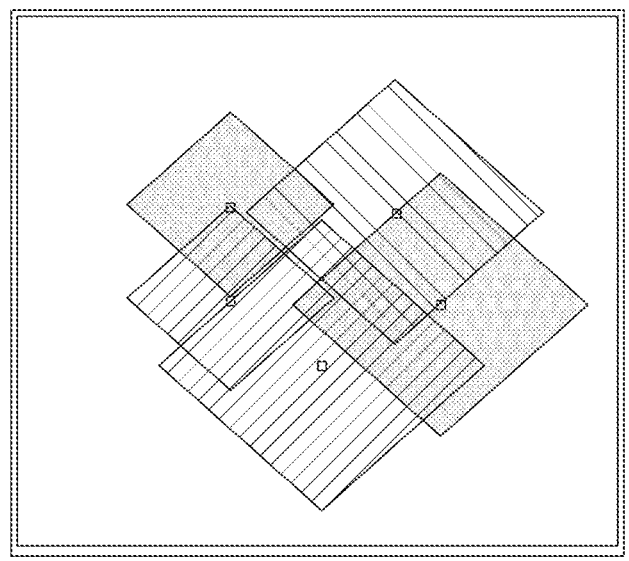
FIGS. 7A and 7B are a diagram for describing a K-nearest neighbor (KNN) algorithm.
Figure 7B:
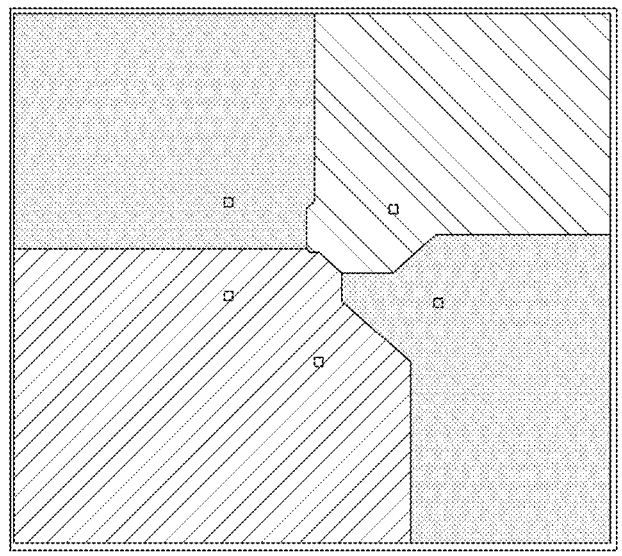

FIGS. 7A and 7B are a diagram for describing the KNN algorithm.

The KNN algorithm (FIG. 7B) may be a classification method which is based on K (where K is an integer of 1 or more) number of nearest neighbors, and like an RBF algorithm (FIG. 7A), a decision-making space may be generated and pattern recognition may be performed from a time at which an effect field is defined.

In this case, the KNN algorithm may have a large difference with the RBF algorithm in that there is no maximum value of an effect field and all decision-making spaces are mapped to one another.

The KNN algorithm, as in FIG. 7B, may be characterized in that effect fields overlap between neurons of different categories. In an embodiment of the described technology, the KNN algorithm may be used to check a corresponding button region and a distance corresponding to all input vectors rather than efficient classification by a classifier.

Figure 8:
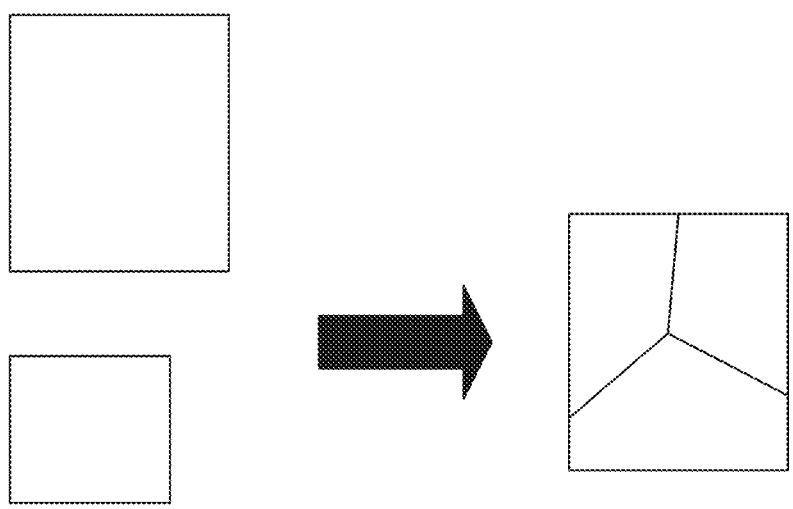
FIGS. 8 and 9 are diagrams for describing a process of applying a kernel window size through learning.

FIGS. 8 and 9 are diagrams for describing a process of applying a kernel window size through learning.

The control unit 140 may allow a kernel window size to be learned based on a surface data set, and then, may apply a learned kernel window size to the KNN algorithm.

Referring to FIG. 8, the control unit 140 may set a kernel window size to be small for a button, where the number of uses thereof by the user is greater than or equal to the threshold value, of a plurality of buttons, and may set a kernel window size to be relatively greater for a button, where the number of uses thereof by the user is less than the threshold value, of the plurality of buttons. In this case, accuracy for a button input may be more enhanced so that the kernel window size is set to be less.

Referring to FIG. 9, the control unit 140 may set a plurality of buttons, where a kernel window size located at a certain distance is set to be relatively greater, of the plurality of buttons to the same kernel window size.

That is, a button where a kernel window size is set to be small may correspond to a button requiring very high accuracy, and thus, a kernel window size may be independently set to be as small as possible. On the other hand, in a case where relatively low accuracy is needed, a corresponding button may be set to one kernel window size. In this case, button No. 8 may correspond to a button requiring high accuracy but may be set to the same kernel window size, and thus, unlike peripheral buttons No. 7 find No. 10, a corresponding button may be learned to have high recognition accuracy on the basis of adjustment of a width of a weight function and may be set to the same kernel window size. This is merely an embodiment, and one button may be set to one independent kernel window size.

Figure 10:
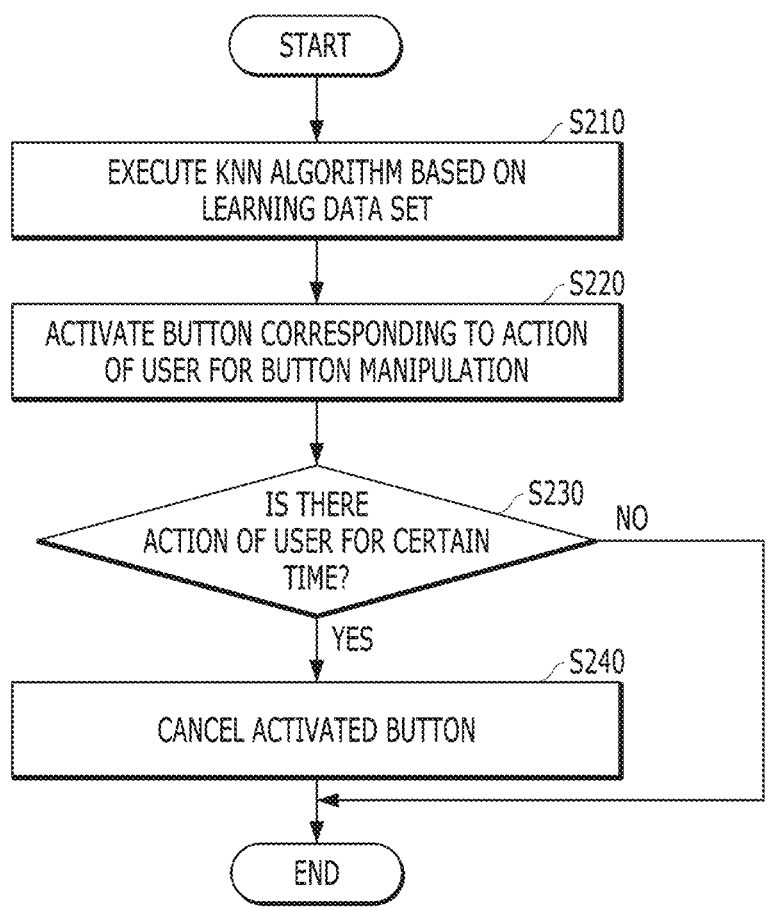
FIG. 10 is a flowchart of a noncontact button apparatus recognition method according to an embodiment of the described technology.

Referring to FIG. 10, after a learning process is completed, a learning-completed KNN algorithm may be executed in step S210, and the control unit 140 may activate a button corresponding to an action of a user for button manipulation on the basis of the KNN algorithm in step S220.

Subsequently, in step S230, the control unit 140 may check whether an action of a user for button manipulation is performed on the activated button for a certain time, and in step S240, the control unit 140 may maintain the activated button to execute a function corresponding to a target button on the basis of a result of the check, or may cancel the activated button.

In an embodiment of the described technology, by using a method of assigning a weight value to a magnetic field sensor value and a method of changing a kernel window size, development may be performed at the low cost in developing hardware for the elevation control panel 100 and the button apparatus 200, and technology for activating a button so as to secure optimal accuracy in a corresponding kernel may be provided.

In the above description, steps S110 to S240 may be further divided into additional steps, or may be combined into fewer steps. Also, depending on the case, some steps may be omitted, and the order of steps may be changed. Despite other omitted descriptions, descriptions given with reference to FIGS. 1 to 10 may be applied to the magnetic field sensing-based noncontact elevator control panel 100 and the button apparatus 200 illustrated in FIGS. 11 and 12.

Hereinafter, the magnetic field sensing-based noncontact elevator control panel 100 and the button apparatus 200 according to an embodiment of the described technology will be described in detail.

Figure 11:
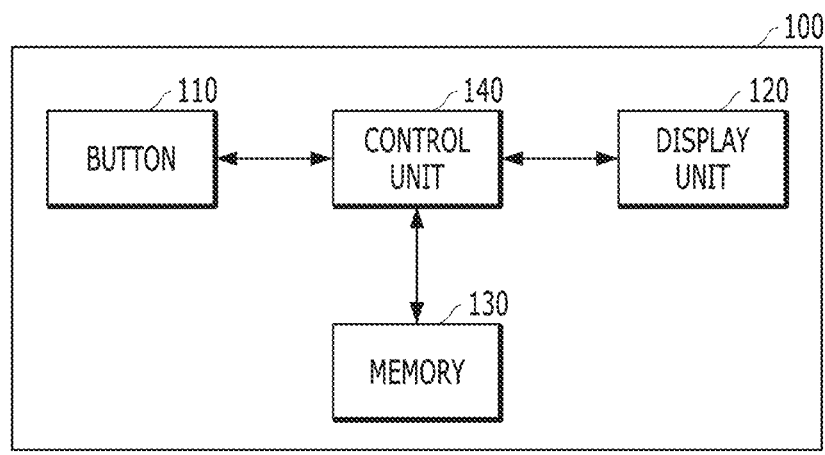
FIG. 11 is a diagram for describing a magnetic field sensing-based noncontact elevator control panel according to an embodiment of the described technology.

FIG. 11 is a diagram for describing a magnetic field sensing-based noncontact elevator control panel 100 according to an embodiment of the described technology.

Referring to FIG. 11, the magnetic field sensing-based noncontact elevator control panel 100 may include a plurality of buttons 110, a display unit 120, a memory 130, and a control unit 140.

The plurality of buttons 110 may include a target floor input button, an entrance door control button, and an emergency call button, and depending on the case, a button may be added or excluded.

The display unit 120 may display information corresponding to a button input, and in addition, may be provided with desired information and may display the desired information on a screen.

The memory 130 may store a program for recognition and learning of the elevator control panel 100, and the control unit 140 may execute the program stored in the memory 130.

The control unit 140 may collect a magnetic field sensor value corresponding to each of a plurality of buttons on the basis of an action of a user for button manipulation, assign a weight value, used for activating the button, to a Z-axis value corresponding to a button input direction of the user for each button, collect the number of uses of each button, adjust a variation width of a weight function based on the Z-axis value on the basis of the number of uses of each button to construct a surface data set corresponding to each button, and set the surface data set to learning data, thereby learning an algorithm.

Subsequently, the control unit 140 may activate a button corresponding to an action of a user for button manipulation on the basis of the algorithm, check whether there is the action of the user for button manipulation corresponding to the activated button for a certain time, and maintain or cancel the activated button on the basis of a result of the check, thereby operating an elevator.

Figure 12:
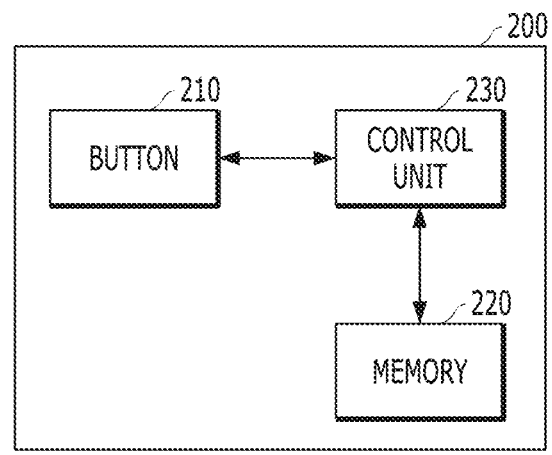
FIG. 12 is a diagram for describing a magnetic field sensing-based noncontact button apparatus according to an embodiment of the described technology.

FIG. 12 is a diagram for describing a magnetic field sensing-based noncontact button apparatus 200 according to an embodiment of the described technology.

Referring to FIG. 12, the magnetic field sensing-based noncontact elevator control panel 200 may include a plurality of buttons 210, a memory 220, and a control unit 230.

The plurality of buttons 210 may perform a function to correspond to a target applied thereto.

The memory 220 may store a program for recognition and learning of the button apparatus 200, and the control unit 230 may execute the program stored in the memory 220.

The control unit 230 may collect a magnetic field sensor value corresponding to each of a plurality of buttons on the basis of an action of a user for button manipulation, assign a weight value, used for activating the button, to a Z-axis value corresponding to a button input direction of the user for each button, collect the number of uses of each button, adjust a variation width of a weight function based on the Z-axis value on the basis of the number of uses of each button to construct a surface data set corresponding to each button, and set the surface data set to learning data thereby learning an algorithm.

Subsequently, the control unit 230 may activate a button corresponding to an action of a user for button manipulation on the basis of the algorithm, check whether there is the action of the user for button manipulation corresponding to the activated button for a certain time, and maintain or cancel the activated button on the basis of a result of the check, thereby operating an elevator.

The operating method of the magnetic field sensing-based noncontact button apparatus including the plurality of buttons according to an embodiment of the described technology may be implemented as a program (or an application) and may be stored in a medium, so as to be executed in connection with a server which is hardware.

The above-described program may include a code encoded as a computer language such as C, C++, JAVA, or machine language readable by a processor (CPU) of a computer through a device interface of the computer, so that the computer reads the program and executes the methods implemented as the program. Such a code may include a functional code associated with a function defining functions needed for executing the methods, and moreover, may include an execution procedure-related control code needed for executing the functions by using the processor of the computer on the basis of a predetermined procedure. Also, the code may further include additional information, needed for executing the functions by using the processor of the computer, or a memory reference-related code corresponding to a location (an address) of an internal or external memory of the computer, which is to be referred to by a media. Also, when the processor needs communication with a remote computer or server so as to execute the functions, the code may further include a communication-related code corresponding to a communication scheme needed for communication with the remote computer or server and information or a media to be transmitted or received in performing communication, by using a communication module of the computer.

The stored medium may denote a device-readable medium semi-permanently storing data, instead of a medium storing data for a short moment like a register, a cache, and a memory. In detail, examples of the stored medium may include read only memory (ROM), random access memory (RAM), CD-ROM, a magnetic tape, floppy disk, and an optical data storage device, but are not limited thereto. That is, the program may be stored in various recording mediums of various servers accessible by the computer or various recording mediums of the computer of a user. Also, the medium may be distributed to computer systems connected to one another over a network and may store a code readable by a computer in a distributed scheme.

Operations of an algorithm or a method described above according to the embodiments of the described technology may be directly implemented as hardware, implemented as a software module executed by hardware, or implemented by a combination thereof. The software module may be provided in RAM, ROM, erasable programmable read only memory (EPROM), electrical erasable programmable read only memory (EEPROM), flash memory, a hard disk, an attachable/detachable disk, and CD-ROM, or a computer-readable recording medium of an arbitrary type well known to those skilled in the art.

According to the embodiments of the described technology, unlike a high-cost and high-specification video processing method or video-based deep learning technology, an increase in the manufacturing cost of an elevator module may be minimized by using a magnetic field-based button.

Moreover, according to the embodiments of the described technology, a small action may be sensed by applying a weight value to a Z-axis value in performing a button input based on a magnetic field-based sensor, and a kernel window size may be adjusted for each button, thereby enhancing accuracy.

Moreover, according to the embodiments of the described technology, position recognition of a corresponding region may be performed based on the kernel window size by applying simple learning, a low-cost MCU may be implemented, and a complexity of an arithmetic operation of a system may be reduced.

Moreover, according to the embodiments of the described technology, the number of button inputs of a user may be analyzed, and as the number of button inputs increases, the kernel window size may decrease and a recognition region between buttons in a corresponding region may be subdivided. Also, when the number of button inputs is small, the kernel window size may increase, and thus, a button characteristic may be divided to be easily recognized.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operating method of a magnetic field sensing-based noncontact button apparatus including a plurality of buttons, the operating method comprising:
collecting a magnetic field sensor value corresponding to each of a plurality of buttons based on an action of a user for button manipulation;
assigning a weight value, used for activating a button, to a Z-axis value of the magnetic field sensor value corresponding to a button input direction of the user for each of the plurality of buttons;
collecting a number of uses of each of the plurality of buttons;
adjusting a variation width of a weight function based on the Z-axis value based on the number of uses of each of the plurality of buttons and constructing a surface data set corresponding to each of the plurality of buttons; and
setting the surface data set to learning data to learn an algorithm for activating the button.

2. The operating method of claim 1, further comprising smoothing the collected magnetic field sensor value with a smoothing filter.

3. The operating method of claim 1, wherein the assigning comprises assigning a larger weight value to the Z-axis value as the action of the user approaches in a button input direction.

4. The operating method of claim 1, wherein the constructing comprises decreasing a variation width of a weight function corresponding to a button, where the number of uses thereof by the user is greater than or equal to a threshold value, of the plurality of buttons, and increasing a variation width of a weight function corresponding to a button, where the number of uses thereof by the user is less than the threshold value, of the plurality of buttons.

5. The operating method of claim 4, wherein the constructing comprises:
generating pieces of first line information respectively passing through X axes and Y axes of the plurality of buttons;
generating pieces of second line information which are parallel to one another along a plurality of first lines and do not pass through the plurality of buttons;
generating a button region corresponding to the plurality of buttons and a non-button region based on the first and second line information; and
applying a variation width-adjusted weight function to the plurality of button regions and the non-button region to construct a surface data set corresponding to each of the plurality of buttons.

6. The operating method of claim 1, wherein:
the algorithm is a K-nearest neighbor (KNN) algorithm,
the setting comprises setting a kernel window size of each button for the KNN algorithm, and
the setting of the kernel window size comprises setting a kernel window size, to be smaller than a predetermined size, for a first button of the plurality of buttons, where the number of uses thereof by the user is greater than or equal to a threshold value, and setting a kernel window size, to be greater than the predetermined size, for a second button of the plurality of buttons, where the number of uses thereof by the user is less than the threshold value.

7. The operating method of claim 6, wherein the plurality of buttons comprise a reference button and adjacent buttons, wherein the adjacent buttons comprise two or more and eight or less buttons immediately adjacent to the reference button, wherein the number of uses for a combination of the reference button and at least one of the adjacent buttons by the user is greater than or equal to the threshold value, wherein the kernel window size comprises a standard kernel window size having the predetermined size, and wherein the setting of the kernel window size comprises setting the combination of the reference button and the at least one of the adjacent buttons to have the standard kernel window size.

8. The operating method of claim 1, wherein the activating comprises:
checking whether the action of the user for button manipulation is performed on the activated button for a certain time; and maintaining or canceling the activated button on the basis of a result of the checking.

9. A magnetic field sensing-based noncontact button elevator control panel comprising:
a plurality of buttons comprising a target floor input button, an entrance door control button and an emergency call button;
a display unit; and
a controller configured to control the display unit and each of the plurality of buttons,
the controller further configured to:
collect a magnetic field sensor value corresponding to each of the plurality of buttons based on an action of a user for button manipulation;
assign a weight value, used for activating one of the plurality of buttons to a Z-axis value corresponding to a button input direction of the user for each button;
collect the number of uses of each button;
adjust a variation width of a weight function based on the Z-axis value on the basis of the number of uses of each button to construct a surface data set corresponding to each button; and
set the surface data set to learning data so as to learn an algorithm.

10. The magnetic field sensing-based noncontact button elevator control panel of claim 9, wherein the controller is further configured to smooth the collected magnetic field sensor value with a smoothing filter.

11. The magnetic field sensing-based noncontact button elevator control panel of claim 9, wherein the controller is further configured to decrease a variation width of the weight function corresponding to a button, where a number of uses thereof by the user is greater than or equal to a threshold value, of the plurality of buttons and increase a variation width of the weight function corresponding to one of the plurality of buttons, where the number of uses thereof by the user is less than the threshold value, of the plurality of buttons.

12. The magnetic field sensing-based noncontact button elevator control panel of claim 11, wherein the controller is further configured to:
generate pieces of first line information respectively passing through X axes and Y axes of the plurality of buttons;
generate pieces of second line information which are parallel to one another along a plurality of first lines and do not pass through the plurality of buttons;
generate a button region corresponding to the plurality of buttons and a non-button region based on the first and second line information; and
apply a variation width-adjusted weight function to the plurality of button regions and the non-button region to construct a surface data set corresponding to each of the plurality of buttons.

13. The magnetic field sensing-based noncontact button elevator control panel of claim 9, wherein:
the algorithm is a K-nearest neighbor (KNN) algorithm, and
the controller is further configured to set a kernel window size, to be smaller than a predetermined size, for a first button of the plurality of buttons, where the number of uses thereof by the user is greater than or equal to a threshold value, and set a kernel window size, to be greater than the predetermined size, for a second button of the plurality of buttons, where the number of uses thereof by the user is less than the threshold value, so as to set a kernel window size of each button for the KNN algorithm.

14. The magnetic field sensing-based noncontact button elevator control panel of claim 13, wherein the plurality of buttons comprise a reference button and adjacent buttons, wherein the adjacent buttons comprise two or more and eight or less buttons immediately adjacent to the reference button, wherein the number of uses for a combination of the reference button and at least one of the adjacent buttons by the user is greater than or equal to the threshold value, wherein the kernel window size comprises a standard kernel window size having the predetermined size, and wherein the controller is further configured to set the combination of the reference button and the at least one of the adjacent buttons to have the standard kernel window size.

15. A magnetic field sensing-based noncontact button apparatus comprising:
a controller configured to:
control a plurality of input buttons;
collect a magnetic field sensor value corresponding to each of a plurality of buttons on the basis of an action of a user for button manipulation,
assign a weight value, used for activating each button, to a Z-axis value corresponding to a button input direction of the user for each button;
collect a number of uses of each button;
adjust a variation width of a weight function based on the Z-axis value on the basis of the number of uses of each button to construct a surface data set corresponding to each button; and
set the surface data set to learning data so as to learn an algorithm.

16. The magnetic field sensing-based noncontact button apparatus of claim 15, wherein the controller is further configured to smooth the collected magnetic field sensor value with a smoothing filter.

17. The magnetic field sensing-based noncontact button apparatus of claim 15, wherein the controller is further configured to decrease a variation width of the weight function corresponding to one the plurality of buttons, where the number of uses thereof by the user is greater than or equal to a threshold value, of the plurality of buttons and increase a variation width of the weight function corresponding to a button, where the number of uses thereof by the user is less than the threshold value, of the plurality of buttons.

18. The magnetic field sensing-based noncontact button apparatus of claim 17, wherein the controller is further configured to:
generate pieces of first line information respectively passing through X axes and Y axes of the plurality of buttons;
generate pieces of second line information which are parallel to one another along a plurality of first lines and do not pass through the plurality of buttons;
generate a button region corresponding to the plurality of buttons and a non-button region based on the first and second line information; and
apply a variation width-adjusted weight function to the plurality of button regions and the non-button region to construct a surface data set corresponding to each of the plurality of buttons.

19. The magnetic field sensing-based noncontact button apparatus of claim 15, wherein:
the algorithm is a K-nearest neighbor (KNN) algorithm, and the controller is further configured to set a kernel window size, to be smaller than a predetermined size, for a first button of the plurality of buttons, where the number of uses thereof by the user is greater than or equal to a threshold value, and set a kernel window size, to be greater than the predetermined size, for a second button of the plurality of buttons, where the number of uses thereof by the user is less than the threshold value, so as to set a kernel window size of each button for the KNN algorithm.

20. The magnetic field sensing-based noncontact button apparatus of claim 19, wherein the plurality of buttons comprise a reference button and adjacent buttons, wherein the adjacent buttons comprise two or more and eight or less buttons immediately adjacent to the reference button, wherein the number of uses for a combination of the reference button and at least one of the adjacent buttons by the user is greater than or equal to the threshold value, wherein the kernel window size comprises a standard kernel window size having the predetermined size, and wherein the controller is further configured to set the combination of the reference button and the at least one of the adjacent buttons to have the standard kernel window size.

* * * * *